US012592871B2

(12) United States Patent
Qian et al.

(10) Patent No.: US 12,592,871 B2
(45) Date of Patent: Mar. 31, 2026

(54) MULTI-LEVEL RESOURCE-UTILIZATION FOR SERVICE REQUEST GENERATION WITH GENERATIVE ARTIFICIAL INTELLIGENCE

(71) Applicant: Dell Products L.P., Round Rock, TX (US)

(72) Inventors: Ming Qian, Newton, MA (US); Michael Barnes, Doylestown, PA (US); Susan W Sharpe, Carrboro, NC (US); Corinne Schulze, Hopkinton, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/788,493

(22) Filed: Jul. 30, 2024

(65) Prior Publication Data

US 2026/0039568 A1 Feb. 5, 2026

(51) Int. Cl.
*H04L 41/50* (2022.01)
*G06F 16/334* (2025.01)
*H04L 41/5074* (2022.01)

(52) U.S. Cl.
CPC ...... *H04L 41/5074* (2013.01); *G06F 16/3347* (2019.01)

(58) Field of Classification Search
CPC ........................ H04L 41/5074; G06F 16/3347
See application file for complete search history.

(56) References Cited

U.S. PATENT DOCUMENTS

| | | | |
|---|---|---|---|
| 11,429,834 B1 * | 8/2022 | Xue | G06F 40/284 |
| 2017/0286970 A1 * | 10/2017 | Pelletier | G06Q 30/016 |
| 2018/0197072 A1 * | 7/2018 | Hausler | G06F 40/279 |
| 2019/0355042 A1 * | 11/2019 | Swierk | G10L 15/183 |
| 2020/0136928 A1 * | 4/2020 | Sethi | H04L 41/16 |
| 2020/0162312 A1 * | 5/2020 | Balasubramanian .. | G06N 5/022 |

OTHER PUBLICATIONS

Article entitled "iHelp: An Intelligent Online Helpdesk System", by Wang et al., dated 2010 (Year: 2010).*

* cited by examiner

*Primary Examiner* — Mahesh H Dwivedi
(74) *Attorney, Agent, or Firm* — Amin, Turocy & Watson, LLP

(57) ABSTRACT

Service request generation using generative artificial intelligence is disclosed. For instance, a user query comprising character strings is received; the character strings are converted to initial vector values associated with a first continuous vector space. Groups of data representing knowledge base articles that are identified. The knowledge base articles are retrieved from first database equipment. The text content of the knowledge base articles is converted to further vector values associated with a second continuous vector space. A listing of support agent identities is determined based on the further vector values being proximate to additional vector values associated with the listing of support agent identities. The additional vector values are used to retrieve the listing of support agent identities from second database equipment and generate and transmit a service ticket to resolve the user query.

20 Claims, 10 Drawing Sheets

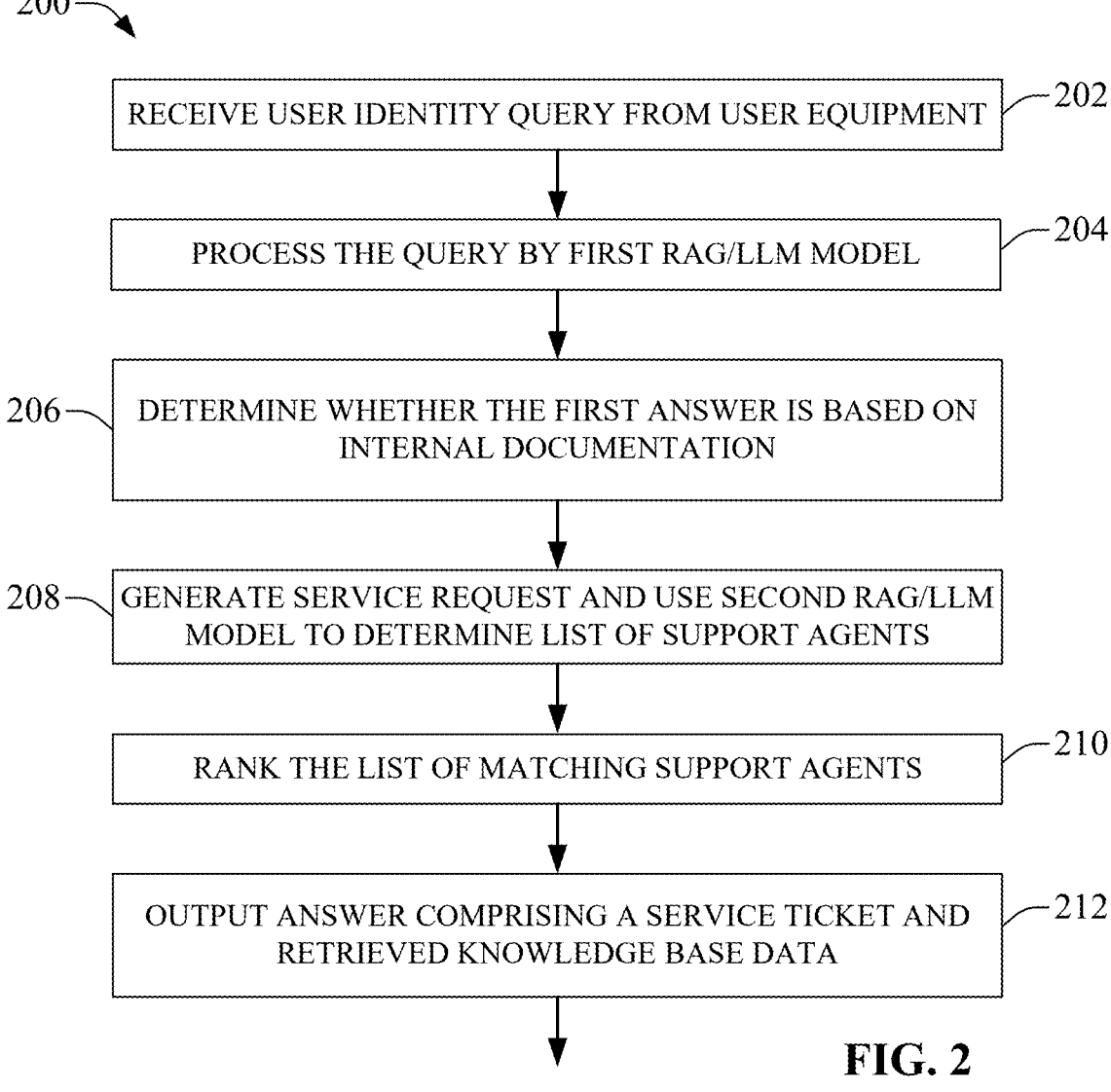

200 —

RECEIVE USER IDENTITY QUERY FROM USER EQUIPMENT ⌐202

PROCESS THE QUERY BY FIRST RAG/LLM MODEL ⌐204

206 — DETERMINE WHETHER THE FIRST ANSWER IS BASED ON INTERNAL DOCUMENTATION

208 — GENERATE SERVICE REQUEST AND USE SECOND RAG/LLM MODEL TO DETERMINE LIST OF SUPPORT AGENTS

RANK THE LIST OF MATCHING SUPPORT AGENTS ⌐210

OUTPUT ANSWER COMPRISING A SERVICE TICKET AND RETRIEVED KNOWLEDGE BASE DATA ⌐212

FIG. 2

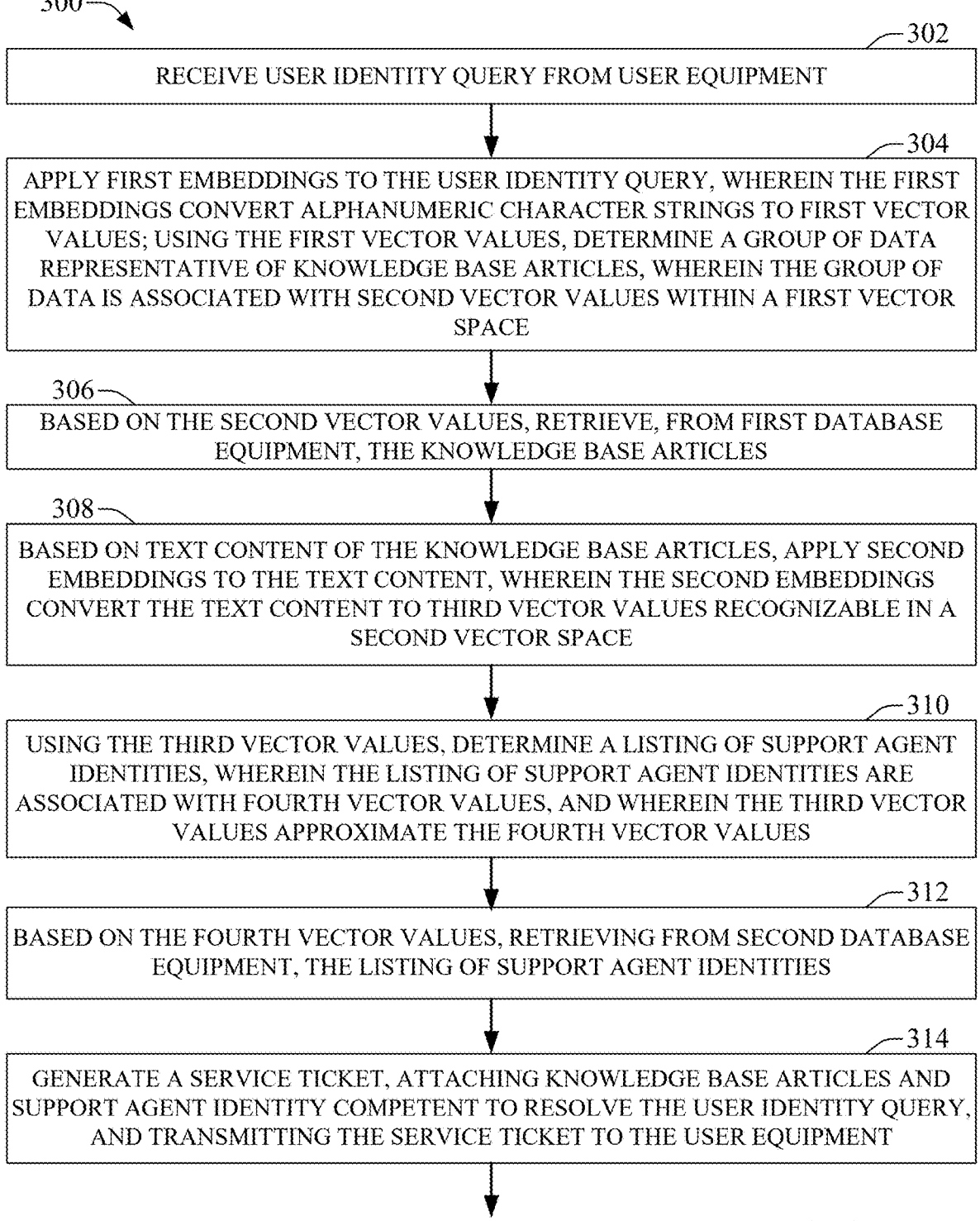

300

302
RECEIVE USER IDENTITY QUERY FROM USER EQUIPMENT

304
APPLY FIRST EMBEDDINGS TO THE USER IDENTITY QUERY, WHEREIN THE FIRST EMBEDDINGS CONVERT ALPHANUMERIC CHARACTER STRINGS TO FIRST VECTOR VALUES; USING THE FIRST VECTOR VALUES, DETERMINE A GROUP OF DATA REPRESENTATIVE OF KNOWLEDGE BASE ARTICLES, WHEREIN THE GROUP OF DATA IS ASSOCIATED WITH SECOND VECTOR VALUES WITHIN A FIRST VECTOR SPACE

306
BASED ON THE SECOND VECTOR VALUES, RETRIEVE, FROM FIRST DATABASE EQUIPMENT, THE KNOWLEDGE BASE ARTICLES

308
BASED ON TEXT CONTENT OF THE KNOWLEDGE BASE ARTICLES, APPLY SECOND EMBEDDINGS TO THE TEXT CONTENT, WHEREIN THE SECOND EMBEDDINGS CONVERT THE TEXT CONTENT TO THIRD VECTOR VALUES RECOGNIZABLE IN A SECOND VECTOR SPACE

310
USING THE THIRD VECTOR VALUES, DETERMINE A LISTING OF SUPPORT AGENT IDENTITIES, WHEREIN THE LISTING OF SUPPORT AGENT IDENTITIES ARE ASSOCIATED WITH FOURTH VECTOR VALUES, AND WHEREIN THE THIRD VECTOR VALUES APPROXIMATE THE FOURTH VECTOR VALUES

312
BASED ON THE FOURTH VECTOR VALUES, RETRIEVING FROM SECOND DATABASE EQUIPMENT, THE LISTING OF SUPPORT AGENT IDENTITIES

314
GENERATE A SERVICE TICKET, ATTACHING KNOWLEDGE BASE ARTICLES AND SUPPORT AGENT IDENTITY COMPETENT TO RESOLVE THE USER IDENTITY QUERY, AND TRANSMITTING THE SERVICE TICKET TO THE USER EQUIPMENT

MULTI-LEVEL RESOURCE-UTILIZATION FOR SERVICE REQUEST GENERATION WITH GENERATIVE ARTIFICIAL INTELLIGENCE

BACKGROUND

Traditional customer support equipment typically relies on error-code-based categorization (e.g., a method used to classify and manage errors in software systems based on predefined error codes) and assignment of service requests without considering user identity (e.g., customer identity) information (e.g., attributes associated with the user), past user identity queries (e.g., queries that a specific user identity, or groups of user identities, can have previously submitted in the past for resolution), a user identity's current level of knowledge, and/or a support agent identity's level of knowledge, expertise, and/or background. This traditional approach can often lead to inefficiencies, delays, and/or mismatches between user identity issues and support agent identities expertise. Accordingly, the longer the time needed to resolve a particular issue, the greater the level of dissatisfaction experienced by the user identity/customer identity. Some of the dissatisfaction can be attributed to service requests not being addressed in a timely fashion, some of the dissatisfaction can be due service request being routed to support agent identities who are not best suited to resolving the issues presented by the user identity.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 2 depicts a method, flow chart, or time sequence, for service request generation using generative artificial intelligence, in accordance with various non-limiting example embodiments.

FIG. 3 illustrates another method, flow chart, or time sequence, for service request generation using generative artificial intelligence, in accordance with various non-limiting example embodiments.

DETAILED DESCRIPTION

Figure 1:
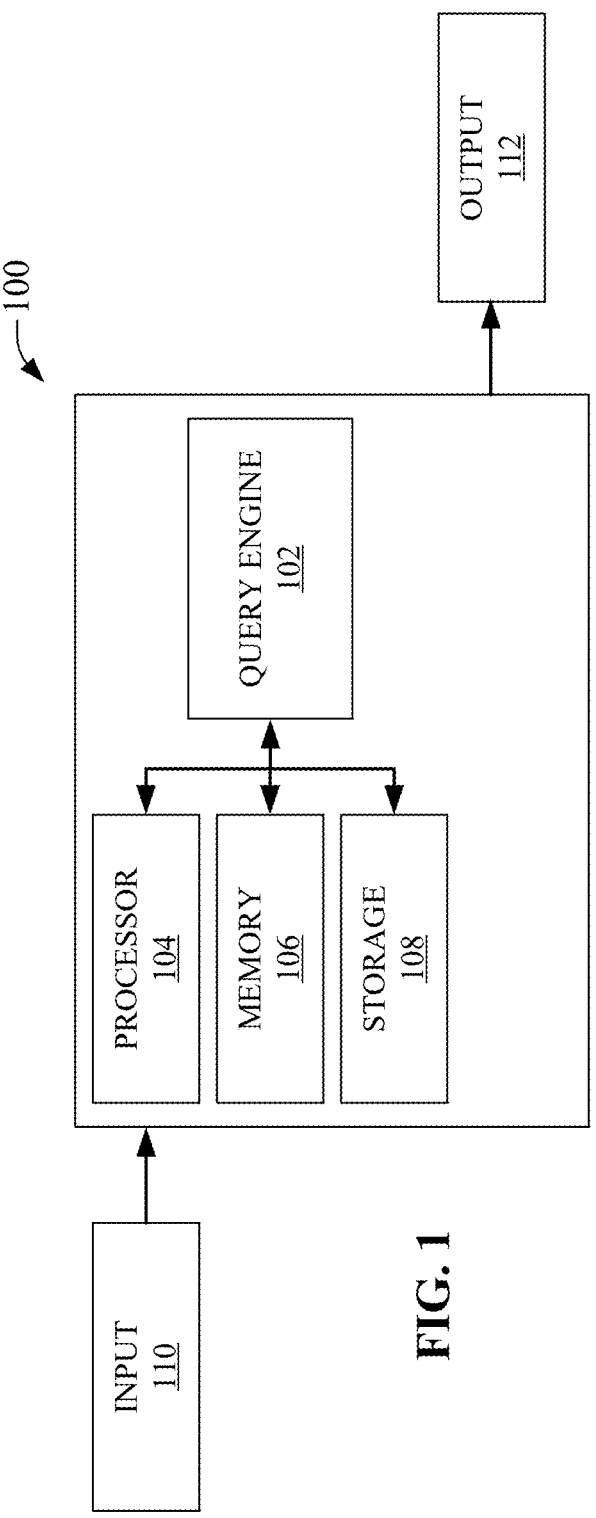
FIG. 1 illustrates a block diagram of a system for service request generation using generative artificial intelligence, in accordance with various non-limiting example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The disclosed systems and methods, in accordance with various embodiments, provide a system, apparatus, or device comprising: a processor; and a memory that stores executable instructions that, when executed by the processor, facilitate performance of operations. The operations can comprise: receiving, from a user equipment, query data comprising one or more alphanumeric character strings; applying a first embeddings process to the query data, wherein the first embeddings process converts the one or more alphanumeric character strings to first vector values that are recognizable in a first continuous vector space hosted by first vector storage equipment, based on the first vector value, determining, within the first continuous vector space, a group of data representing knowledge base articles that are associated with second vector values that approximate the first vector values; based on the second vector values, retrieving, from first database equipment, the knowledge base articles; based on text content of the knowledge base articles, applying a second embeddings process to the text content of the knowledge base articles, wherein the second embeddings process converts the text content of the knowledge base articles to third vector values recognizable in a second continuous vector space hosted by second vector storage equipment, wherein the text content can be presented in a natural language text format to an end user, and response content from the end user can be supported by the related knowledge base articles, a natural language response from the end user can be supported by the related knowledge base articles, and the natural language response can comprise knowledge base article content that can be proprietary information that once flagged can be vectorized and embedded for further processing for support agent review, based on the third vector values, determining a listing of support agent identities, wherein the listing of support agent identities is associated with fourth vector values, and wherein the fourth vector values approximate the third vector values; based on the fourth vector values, retrieving from second database equipment, the listing of support agent identities capable of addressing a query included in the query data; generating a service ticket comprising attaching the knowledge base articles and a support agent identity of the support agent identities competent to resolve the query; and transmitting the service ticket to the user equipment.

The first embeddings process can comprise: prior to applying the second embeddings process to the text content of the knowledge base articles, inputting the text content of the knowledge base articles to a first large language model that generates a first answer representing human identity recognizable text, wherein the first answer is transmitted to the user equipment, wherein first user input associated with a user identity comprises appraisal information indicative of an appraisal of the first answer, and wherein, based on the appraisal of the first answer being determined to be unsatisfactory, second user input associated with the user identity, received via the user equipment, notifies the system that the first answer is unsatisfactory. This appraisal process can involve the identification and evaluation of whether company proprietary information is involved Additional operations can comprise, prior to generating the service ticket, inputting the knowledge base articles and a support agent identity to a second large language model that generates a second answer representing human recognizable text.

In some embodiments the first embeddings process can comprise: tokenizing the one or more alphanumeric character strings into one or more tokens, wherein the tokenizing removes natural language words that are determined to be irrelevant to a semantic meaning of the one or more alphanumeric character strings. In various other embodiments, the first embedding process can comprise stemming the one or more alphanumeric character strings to reduce words representative of the one or more character strings to a root form of the words.

In relation to the foregoing, the first database equipment can be a knowledge base article repository that is extensible and provides support for a structured query language.

In accordance with further embodiments, the subject disclosure describes a method, comprising a sequence of acts that can include: in response to receiving, from a user equipment, query data comprising one or more alphanumeric character strings, performing, by knowledge base article equipment comprising at least one processor, a first embeddings process to the query data, wherein the first embeddings process converts the one or more alphanumeric character strings to first vector values that are recognizable in a first continuous vector space hosted by first vector storage equipment; determining, by the knowledge base article equipment, within the first continuous vector space, a group of data representing knowledge base articles that are associated with second vector values that approximate the first vector values; retrieving, by the knowledge base article equipment from first database equipment, the knowledge base articles; based on text content of the knowledge base articles, performing, by the knowledge base article equipment, a second embeddings process to the text content of the knowledge base articles, wherein the second embeddings process converts the text content of the knowledge base articles to third vector values recognizable in a second continuous vector space hosted by second vector storage equipment, wherein the text content can be presented in a natural language text format to an end user, and response content from the end user can be supported by the related knowledge base articles, a natural language response from the end user can be supported by the related knowledge base articles, and the natural language response can comprise knowledge base article content that can be proprietary information that once flagged can be vectorized and embedded for further processing for support agent review; determining, by the knowledge base article equipment, a listing of support agent identities, wherein the listing of support agent identities is associated with fourth vector values, and wherein the fourth vector values approximate the third vector values; retrieving, by the knowledge base article equipment, from second database equipment, the listing of support agent identities capable of addressing a query included in the query data; generating, by the knowledge base article equipment, a service ticket comprising attaching the knowledge base articles and a support agent identity of the support agent identities competent to resolve the query; and transmitting, by the knowledge base article equipment, the service ticket to the user equipment.

In many embodiments, the first embeddings process can comprise: prior to applying the second embeddings process to the text content of the knowledge base articles, inputting, by the knowledge based article equipment, the text content of the knowledge base articles to a first large language model that generates a first answer representing human identity recognizable text, wherein the first answer is transmitted to the user equipment, and wherein first user input associated with a user identity specifies an appraisal of the first answer and based on the appraisal of the first answer being unsatisfactory, second user input associated with the user identity, via the user equipment, notifies the system that the first answer is unsatisfactory. This appraisal process can involve the identification and evaluation of whether company proprietary information is involved In some embodiments, prior to generating the service ticket, inputting, by the knowledge base article equipment, the knowledge base articles and a support agent identity to a second large language model that generates a second answer representing human identity recognizable text. In other embodiments, the first embeddings process can comprise tokenizing, by the knowledge base article equipment, the one or more alphanumeric character strings into one or more tokens, and wherein the tokenizing removes words in natural language that are irrelevant to a semantic meaning of the one or more alphanumeric character strings. In accordance with further embodiments the first embedding process can comprise stemming, by the knowledge base equipment, the one or more alphanumeric character strings to reduce words representative of the one or more character strings to a root form of the words. In additional embodiments, the first database equipment can be an extensible knowledge base article repository that provides support for a structured query language.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: receiving, from a user device, query data comprising one or more alphanumeric character strings; applying a first embeddings process to the query data, wherein the first embeddings process converts the one or more alphanumeric character strings to first vector values that are recognizable in a first continuous vector space hosted by first vector storage equipment; based on the first vector value, determining, within the first continuous vector space, a group of data representing knowledge base articles that are associated with second vector values that approximate the first vector values; based on the second vector values, retrieving, from first database equipment, the knowledge base articles; based on text content of the knowledge base articles, applying a second embeddings process to the text content of the knowledge base articles, wherein the second embeddings process converts the text content of the knowledge base articles to third vector values recognizable in a second continuous vector space hosted by second vector storage equipment, wherein the text content can be presented in a natural language text format to an end user, and response content from the end user can be supported by the related knowledge base articles, a natural language response from the end user can be supported by the related knowledge base articles, and the natural language response can comprise knowledge base article content that can be proprietary information that once flagged can be vectorized and embedded for further processing for support agent review; based on the third vector values, determining a listing of support agent identities, wherein the listing of support agent identities is associated with fourth vector values, and wherein the fourth vector values approximate the third vector values; based on the fourth vector values, retrieving, from second database equipment, the listing of support agent identities determined to be capable of addressing a query included in the query data; generating a service ticket by attaching the knowledge base articles and a support agent identity of the support agent identities competent to resolve the query; and transmitting the service ticket to the user device.

In some example embodiments, the first embeddings process comprises: prior to applying the second embeddings process to the text content of the knowledge base articles, feeding the text content of the knowledge base articles to a first large language model that generates a first answer representing human identity recognizable text, and the first answer can be transmitted to the user device, wherein a user identity provides an appraisal of the first answer and based on the appraisal of the first answer being unsatisfactory, a notification associated with the user identity can be received by the system, via the user device, indicative that the first answer is unsatisfactory. This appraisal process can involve the identification and evaluation of whether company proprietary information is involved.

In some embodiments, the operations can comprise prior to generating the service ticket, feeding the knowledge base articles and a support agent identity to a second large language model that generates a second answer representing human recognizable text. In additional embodiments, the first embeddings process can comprise tokenizing the one or more alphanumeric character strings into one or more tokens, wherein the tokenizing removes words in natural language that are irrelevant to a semantic meaning of the one or more alphanumeric character strings. In further embodiments, the first embedding process can comprise stemming the one or more alphanumeric character strings to reduce words representative of the one or more character strings to a root form of the words.

As stated above, traditional customer support equipment typically rely on error-code-based categorization (e.g., a method used to classify and manage errors in software systems based on predefined error codes) and assignment of service requests without considering user identity (e.g., customer identity) information (e.g., attributes associated with the user), past user identity queries (e.g., queries that a specific user identity, or groups of user identities, can have previously submitted in the past for resolution), a user identity's current level of knowledge, and/or a support agent identity's level of knowledge, expertise, and/or background. This traditional approach can often lead to inefficiencies, delays, and/or mismatches between user identity issues and support agent identities expertise. Accordingly, the longer the time needed to resolve a particular issue, the greater the level of dissatisfaction experienced by the user identity/customer identity. Some of the dissatisfaction can be attributed to service requests not being addressed in a timely fashion, some of the dissatisfaction can be due service request being routed to support agent identities that are not best suited to resolving the issues presented by the user identity.

Many corporate entities have vast repositories of data that can beneficially be used to auto-generate service requests to satisfy user identity/customer identity queries. These repositories of data can be in the form of multiple collections of database equipment dedicated to persisting data that can be employed in servicing customer identity/user identity queries and/or requests for service. However, these resources are usually underutilized due to the lack of effective integration with their customer support and service request workflows/mechanisms. Challenges associated with integrating pertinent corporate entity repositories of data with customer support and service request workflows can include the fact that is can be hard to locate relevant information dynamically and quickly which can lead to increased workload for support staff and significant reduction of perceived quality of service from the perspective of the customer identity/user identity. Additionally, this underutilization can also contribute to inconsistencies in the quality of support provided, as resolutions may not always align with the best use of the existing resources.

To date, traditional customer support services have had a delay in service request generation and a ticket resolution time. There often is a lack of capability to adapt to constantly changing conditions in relation to customer queries and patterns, and changes in support agent availability and expertise. This rigidity can hinder the efficiency and effectiveness of customer support services, which can lead to delays in service requests creation, issue resolution, suboptimal allocation of resources, and a general failure to support and address the customer/user identity based on the issues for which the customer/user identity initiated the query.

To address the foregoing issues the subject disclosure details and describes systems and methods that streamline the process or handling customer services requests. As a cursory overview, the systems and methods use multilevel retrieval augmented generation (RAG) and large language models (LLM) implementations, whereby a query initiated by a user/customer identity, via user equipment associated with the user/customer identity, is fed forward to first RAG/LLM implementation associated with first enterprise knowledge base equipment persisting and maintaining a first collection of specific knowledge data, a first answer is then generated by the first RAG/LLM implementation. The first answer generated by the first RAG/LLM implementation can subsequently be fed forward to a second disparate RAG/LLM implementation associated with second enterprise knowledge base equipment persisting and maintaining a second collection of specific knowledge data.

It should be noted that the first collection of specific knowledge data and the second collection of knowledge data respectively maintained and stored to the first enterprise knowledge base equipment and/or to the second enterprise knowledge base equipment can pertain to disparate information. For instance, without limitation and/or loss of generality, in the context of this disclosure, the first collection of knowledge data can pertain to data related to how to resolve issues related to computer hardware and/or software (e.g., knowledge-base articles, manuals, release notes, etc.), and the second collection of knowledge data can relate to personnel (e.g., human identities, computer generated machine learning/artificial intelligence based support agents, and the like) with the necessary experience, education, and/or knowledge to physically remedy and/or virtually address and/or assist in remedying issues raised by the initiating query that can have been received from a user/customer identity.

Concerning the second collection of knowledge data this information can comprise data related to expertise (e.g., learned—certifications received through education programs and/or acquired-on-the-job/vocational training, . . . ), availability, location, and historical performance data (e.g., feedback data that can be used to train machine learning/ artificial intelligence models, data that can be used to better train human identities in regard to customer/client relations, etc.), and the like associated with the personnel.

The use of the first RAG/LLM implementation and the second RAG/LLM implementation can provide for automatic creation and assignment of service request tickets in an efficient and accurate manner.

Figure 7:
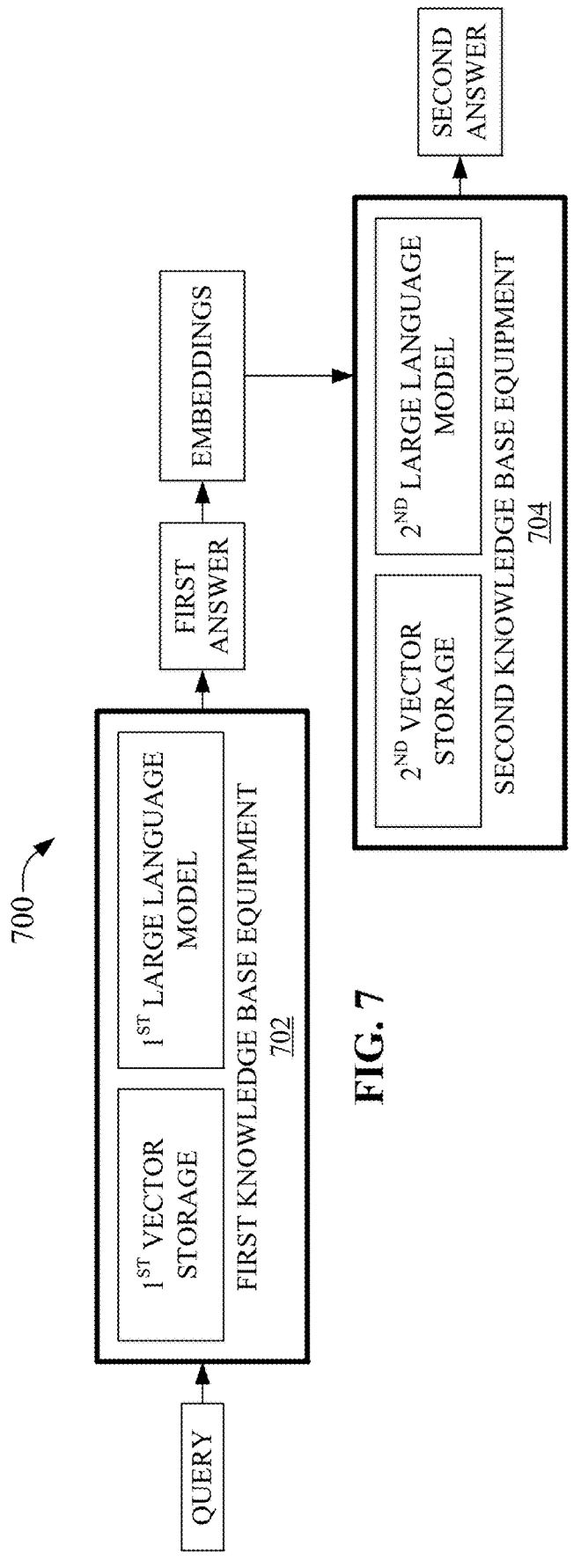
FIG. 7 provides schematic overview of a system for service request generation using generative artificial intelligence, in accordance with various non-limiting example embodiments.

FIG. 7 depicts a generalized system 700 for service request generation using generative artificial intelligence, in accordance with example embodiments set forth herein. System 700 can comprise first knowledge base equipment 702 and second knowledge base equipment 704. It should be observed that while this disclosure, solely for easy of exposition, is explicated in terms of two separate knowledge base equipment (e.g., first knowledgebase equipment 702 and second knowledge base equipment 704), similar functionalities and/or facilities can be effectuated and/or accomplished by using single server equipment. Moreover, system 7 can be operational and/or hosted on a grouping of equipment, such as a collection of database equipment, a group of server equipment, a geographically dispersed cluster of equipment, and the like, without necessarily departing from the ambit of the subject disclosure.

As illustrated in FIG. 7, the overall flow can commence with a query being received by first knowledge base equipment 702. The query can then be processed by the first knowledge base equipment 702, using a first RAG/LLM processing implementation to provide a first answer. The first answer can then be embedded and supplied as input to second knowledge base equipment 704. Second knowledge base equipment 704, using a second RAG/LLM processing implementation can provide a second answer which can be a desired outcome.

As depicted, first knowledge base equipment 702 can comprise a first vector storage implementation and an appropriately trained first large language model implementation. Similarly, the second knowledge base equipment 704 can comprise a second vector storage implementation and an appropriately trained second large language model implementation. It should be well understood that the first vector storage implementation associated with the first large language model and the second vector storage implementation associated with the second large language model can each have respectively been trained using disparate collections of training data. For instance, the first vector storage implementation associated with the first large language model implementation can have been trained using data pertinent to servicing user queries associated with defined/specific corporate entity knowledge base articles, software and/or hardware manuals, release notes, and the like. The second vector storage implementation associated with the second large language model implementation can have been trained using support agent-based information including support agent expertise, availability, location, historic performance metric data, and the like.

Concerning the first vector storage implementation and the second vector storage implementation, these can be respective vector database implementations. In general, vector stores or vector databases are specialized types of databases designed to store, manage, and retrieve high-dimensional vectors efficiently. The high-dimensional vectors typically represent data in the form of embeddings, which can be used in various machine learning and artificial intelligence applications, such as similarity search, recommendation systems, and natural language processing.

Vector stores or vector databases use vector embeddings that are high-dimensional numerical representations of data, such as words, images, documents, that capture their semantic meaning or features. Further, vector databases can perform similarity searches, finding vectors that are proximate to a specified query vector in an embedding space, often measured using distance metrics, such as Euclidean distance (e.g., a measure of the straight line distance between two points in Euclidean space; this distance is often used to measure the similarity or dissimilarity between data points represented as vectors), cosine similarity (e.g., a metric used to measure how similar two vectors are, regardless of their magnitude, it is often used in text analysis and information retrieval, and is determined as the cosine of the angle between the vectors), or Manhattan distance (e.g., a distance metric that determines the distance between two points in a grid-based path by summing the absolute differences of their coordinates, unlike a Euclidean distance that can be the shortest straight-line distance, a Manhattan distance measures the distance traveled along axes at right angles to one another).

Additionally, vector databases use indexing which can be the process of creating data structure that allow for efficient search and retrieval of vectors. Common indexing methods can include: (i) KD-Trees—a type of binary search tree used for organizing points in a k-dimensional space. KD-Trees are useful for multidimensional search operations such as range searches and nearest neighbor searches; (ii) Ball Trees—a binary tree data structure used for partitioning a space into nested hyper-spheres (or balls). Ball Trees are useful for efficient nearest neighbor searches, especially in high-dimensional spaces. Unlike KD-Trees, which split the space with hyper-planes, Ball Trees use hyper-spheres, making suitable for data that is not uniformly distributed; and (iii) Approximate Nearest Neighbor (ANN) search processes that are designed to quickly find points in a dataset that are approximately close to a query point. These search processes are particularly useful when dealing with large, high-dimensional datasets where exact nearest neighbor searches can be computationally expensive.

Embeddings as described in the context of this disclosure are vector embeddings that can be numerical representations of objects, such as words, sentences, or images, in a continuous vector space. Embeddings capture the semantic meaning or features of the objects in a way that facilitates various machine learning and natural language processing tasks. As a brief overview, embeddings are vectors in high-dimensional space, wherein each dimension can represent a specific attribute or feature of the object being embedded. Generally, objects that are semantically similar or share similar features can be represented by vectors that are close to one another in the embedding space. The distance between vectors can be measured using metrics like cosine similarity or Euclidean distance.

Typically, embeddings reduce the dimensionality of input data while preserving essential information. For example, words represented as one-hot vectors in a high-dimensional space (e.g., a vocabulary size) can be reduced to dense vectors of lower dimensions. Concerning one-hot vectors, these are binary vectors that can be used to indicate the presence of a single categorical value within a list of possible values, wherein each element of the vector can correspond to a category, and the element can be set to 1, if the category is present and 0 otherwise.

In relation to the first large language model and the second large language model, these language models, like their respective and associated vector storage implementations, can be distinct. Concerning the first large language model, this model for instance, can have been trained using a corpus of corporate entity specific knowledge base articles (e.g., written resources designed to provide comprehensive information on specific topics, often used to help users understand, troubleshoot, and/or learn about a product or service), manuals associated with the product and/or service, release notes pertaining to the corporate entity specific products and/or services, and the like. In contrast and in regard to the second large language model, this model, for example, can have been developed using data related to a grouping of support agents (typically human identities, though deployed or deployable artificial intelligence/machine learning based agent instantiations are within the practicable contemplation of the inventors).

Large learning models (LLMs) are a type of artificial intelligence model that has been trained on a massive amount of textual data to understand and generate human-like text. These models are typically based on deep learning architectures (e.g., specialized neural network models designed to learn from large amounts of data through multiple layers of abstraction, and that have achieved state-of-the-art performance in various tasks such as image and speech recognition, natural language processing, and more), particularly transformer-based models (e.g., a type of deep learning model that enables the processing of sequences in parallel rather than sequentially, leading to significant improvements in performance and scalability) that have advanced the capabilities of natural language understanding and generation.

Large language models are typically trained on vast amounts of data, often comprising billions of words or more. This extensive training data allows the models to learn patterns, semantics, syntax, and nuances of human language across various domains and contexts. Further, most modern large language models can be based on one or more transformer architectures, which can use self-attention mechanisms to capture dependencies between words in a sequence more effectively than previous architectures, such as neural networks designed to handle sequential data, where unlike traditional feed forward neural networks, have connections that form cycles, allowing information to persist across time steps (e.g., recurrent neural networks (RNNs), and/or variants of the RNN that can have been designed to overcome the limitations of standard RNNs, particularly the problem of vanishing and exploding gradients (e.g., Long-Short Term Memory (LSTMs) networks); LSTMs generally capture long-term dependencies in sequential data, making these networks highly effective for tasks like language modeling, machine translation, and time series forecasting.

It should be noted that self-attention mechanisms are mechanisms that allow a model to weigh the importance of different elements in a sequence relative to each other, such weighting enables the model to capture long-range dependencies without the need for recurrent layers (e.g., layers that allow the neural network, such as a RNN, to capture temporal dependencies in the data, making them suitable for tasks involving sequences, such as time series analysis, language modeling, and speech recognition), thereby making transformer architectures that incorporate self-attention mechanisms highly effective for processing sequential data.

Moreover, large language models can be typically pre-trained in an unsupervised manner (e.g., the large language model is trained on a unlabeled datasets, such that each training example is not paired with an output label) on massively large datasets using objectives like language modeling (predicting the next word in a sequence) or masked language modeling (predicting masked words in a sequence). These pre-trained models can then be fine-tuned on specific tasks with smaller, task-specific datasets to improve performance.

Concerning the respective first RAGs and second RAGs can respectively be paired with the first large language model and the second large language model. Much like the respective language models with which the RAG implementation has been paired, the RAGs can have been trained in disparate manners in order to capture their respective purposes. For instance, the RAG associated with the first large language model can be trained in the context of retrieving data associated with knowledge base articles, manuals, release notes and the like. The RAG associated with the second large language model can have been trained in the context of retrieving data associated with support agents such as a support agent's expertise in successfully resolving issues arising in a defined technology area, the support agent's availability, location, historical performance data associated with how successful the support agent has been in resolving problems in their area of expertise, and the like.

Generally, a RAG is a technique that combines the strengths of retrieval-based models and generation-based models to improve the quality and relevance of generated text. Generally, a RAG comprises a retriever component and a generator component. The retriever component typically retrieves relevant information from a large corpus or knowledge base. The retriever component uses techniques such as dense passage retrieval (DPR), a technique used in question-answering and text search tasks, to efficiently retrieve relevant passages of text from a large corpus of documents. DPR contrasts with traditional sparse retrieval methods by leveraging dense representations of text, such as embeddings generated by deep learning models like transformers. The retriever component can also use a technique known as best matching 25 (BM25) a ranking function used in information retrieval to score the relevance of documents to a given search query. The retriever aspect narrows down the information space to a smaller, more relevant subset that can be used by the generator.

Concerning the generator component, this component generates text based on the retrieved documents and the input query to generate coherent and contextually relevant responses. Generally, the generator component can use a class of deep learning models, known as transformer models, which have revolutionized various natural language processing (NLP) tasks, including language modeling, machine translation, text generation, and more. The use of transformer model is a departure from earlier recurrent and convolutional neural network (RNN and CNN) architectures for sequence modeling tasks. The generator component integrates the retrieved information into its response, ensuring that the generated text is both informative and contextually accurate.

In regard to retrieval-models, these are a type of machine learning model designed to retrieve relevant information from a large corpus or database in response to a query. These models are widely used in information retrieval systems, search engines, and conversational agents to find and return the most relevant documents, passages, or pieces of information based on the input query.

With regard to generation-based models, these are a class of machine learning models that are capable of generating new content, such as text, images, or even music, based on the patterns and structures learned from a training dataset. These models are typically associated with natural language processing (NLP) tasks where the goal is to produce coherent and contextually relevant text.

Figure 8:
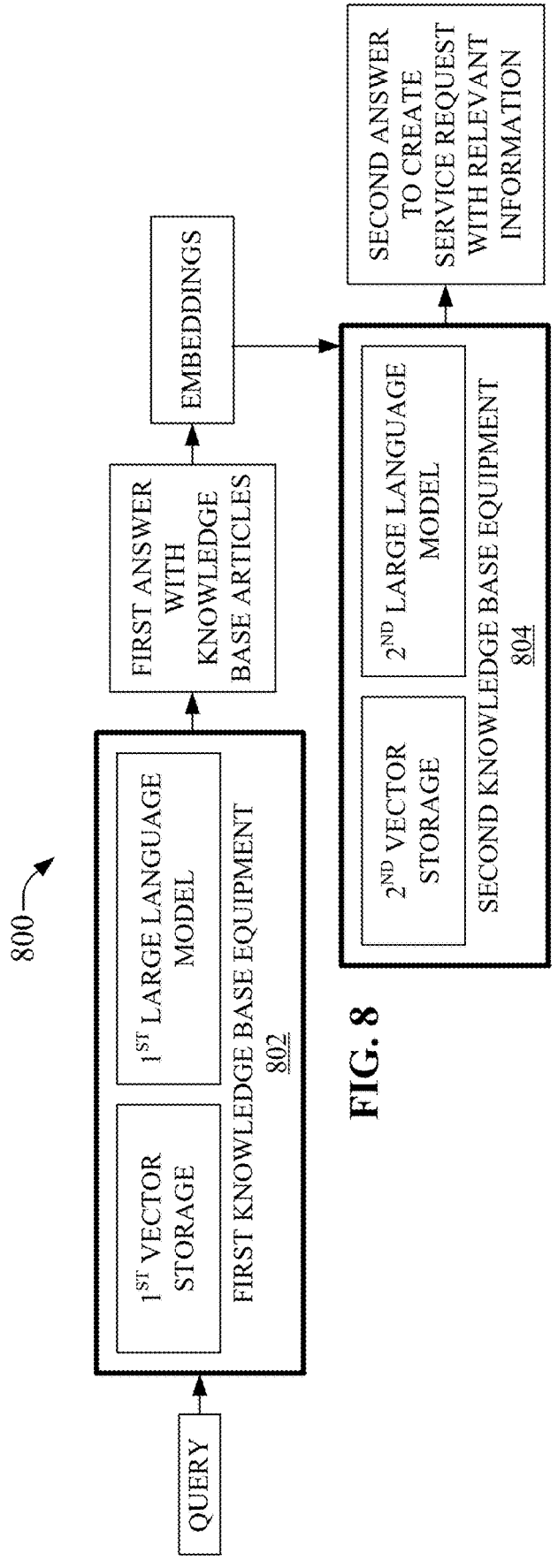
FIG. 8 provides an additional schematic overview of a system for service request generation using generative artificial intelligence, in accordance with various non-limiting example embodiments.

FIG. 8 provides a more detailed generalization of system 700 (now represented as system 800) for service request generation using generative artificial intelligence, in accordance with example embodiments set forth herein. System 800 can use a multilevel RAG/LLM pairing with first knowledge base equipment 802 comprising knowledge base articles, manuals, release notes, etc. and second knowledge base equipment 804 comprising support agent-based data including expertise, availability, and historical performance data, etc.

FIG. 1 depicts a system 100 for service request generation using generative artificial intelligence, in accordance with various non-limiting example embodiments. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IoT) equipment, multimedia players, and the like.

System 100 can comprise query engine 102 that can be in operative communication with processor 104, memory 106, and storage 108. Query engine 102 can be in communication with processor 104 for facilitating operation of computer-executable instructions or machine-executable instructions and/or components by query engine 102; memory 106 for storing data and/or computer-executable instructions and/or machine-executable instructions and/or components; and storage 108 for providing longer term storage of data and/or machine-readable instructions and/or computer-readable instructions. Additionally, system 100 can also receive input 110 for use, manipulation, and/or transformation by query engine 102 to produce one or more useful, concrete, and tangible results, and/or transform one or more articles to different states or things. Further, system 100 can also generate and output the useful, concrete, and tangible result and/or the transformed one or more articles as output 112.

Figure 4:
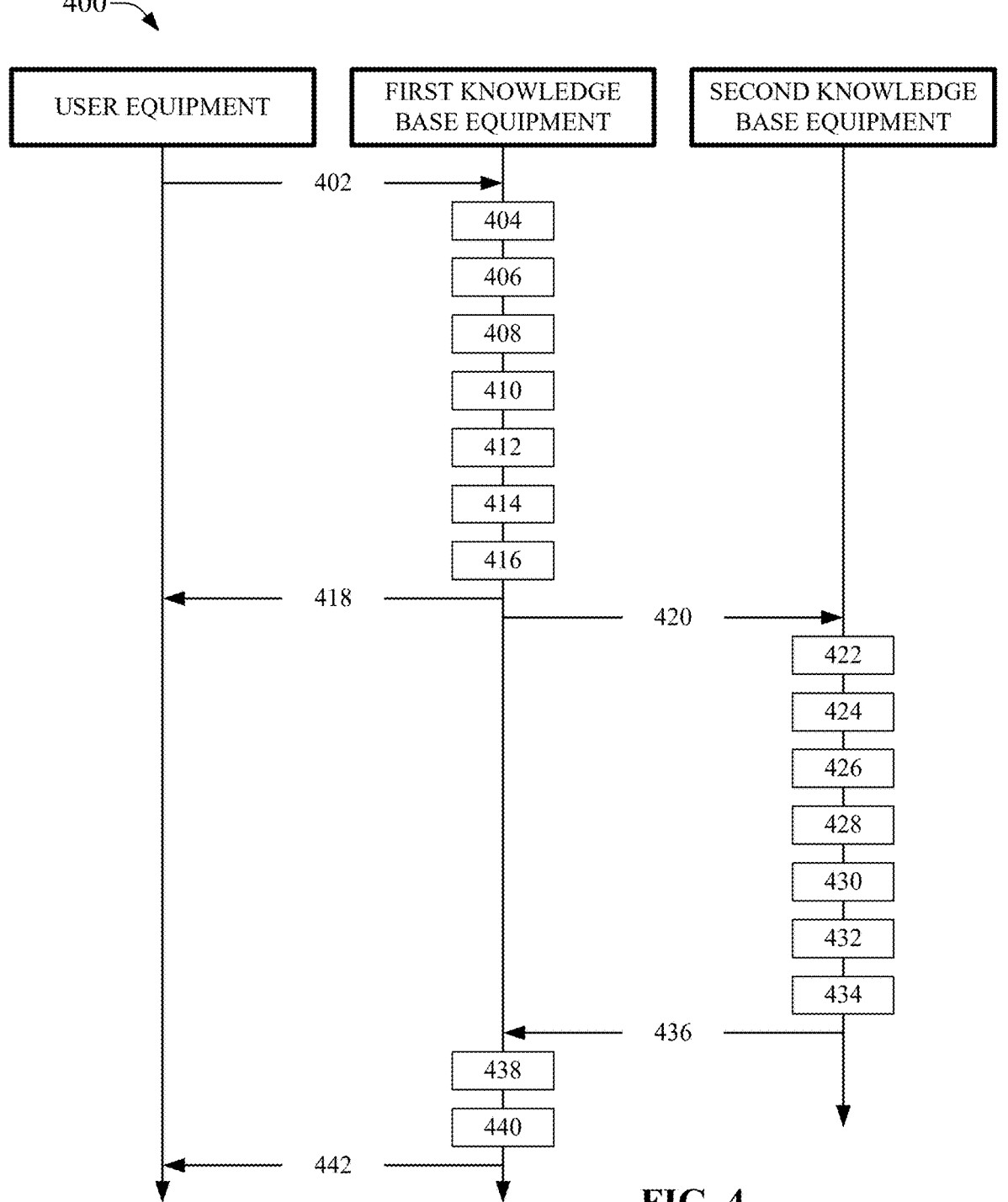
FIG. 4 illustrates an example time sequence chart depicting events and interactions for service request generation using generative artificial intelligence, in accordance with various non-limiting example embodiments.

Now with reference to FIG. 4 that illustrates a time sequence chart 400, for service request generation using generative artificial intelligence, in accordance with various non-limiting example embodiments, time sequence 400 can commence at act 402, wherein query engine 102 can receive, as a grouping of text data, a user identity query from user equipment. At act 404, the received user query can be processed by first knowledge base equipment (e.g., 702 and/or 802). The processing by first knowledge base equipment can comprise performing embeddings on the user identity query.

In some embodiments, at act 404, performing embeddings on the user query can include tokenizing the text; breaking down text into smaller units called tokens. These tokens can be words, sentences, or individual characters, depending on the level of granularity needed for the analysis or processing task. Tokenization is a crucial step in natural language processing (NLP) and text analysis tasks because it enables computers to understand and process textual data. Tokenization can also include removing stop words for instance, words in natural language that are typically filtered out or ignored by search engines and text processing algorithms because they are considered to have little value in terms of meaning or relevance to the overall context of a document. Examples of stop words in English can include "the," "is," "at," "which," "and," "or," etc. These words are often excluded from text analysis to focus on the more meaningful words that carry important semantic content. Additionally, tokenizing can also include creating data structures, such as inverted indices—data structures used primarily in information retrieval systems, such as search engines, to efficiently store and retrieve documents based on the terms they contain. Inverted indices can be considered as an inverted version of a forward index (e.g., a data structure used in information retrieval systems to map documents to the terms they contain). Unlike inverted indices that map terms to documents, forward indices store the content of each document along with metadata, allowing for efficient access to the full text of documents, which typically maps from documents to terms, which in turn allow for quick lookup of terms and documents.

Once the user identity query has been tokenized, the tokenized user identity query can be processed to extract relevant terms and phrases. Extracting relevant terms and phrases in certain embodiments can include stemming—a process that reduces words to their base or root form so as to normalize variants of words that can share the same stem. In additional and/or alternative embodiments, the tokenized user identity query can undergo lemmatization, a text normalization technique similar to stemming. While stemming reduces words to their base form by removing prefixes and suffixes, lemmatization in contrast considers the morphological analysis of words and aims to return the base or dictionary form of a word, known as the lemma. A morphological analysis comprises examining and processing the structure of words in a language, and involves understanding and analyzing the internal structure of words to extract meaningful components such as stems, root words, prefixes, suffixes, and inflections.

In response to having tokenized and/or performed stemming, lemmatization, and/or any morphological analyses required, the user identity query, at act 406, based at least in part on the user identity query having been tokenized, undergone stemming, lemmatization, and morphological analysis can be used to determine the closest groups of: knowledge base articles, software and/or hardware manuals, release notes and the like, that address the user identity query. Generally, retrieval of these knowledge base articles, manual, software and/or hardware manual, release notes, etc. can be performed in collaboration of vector storage/database equipment (e.g., specialized types of databases designed to store, manage, and retrieve high-dimensional vectors efficiently).

Once the closest groups of knowledge base articles, software and/or hardware manuals, release notes, etc., that address the user identity query, these knowledge base articles, software and/or hardware manuals, release notes, etc. can be retrieved, at act 408, from a knowledge base article repository, such as relational database management system (RDBMS) that is robust, extensible, and support for structured query language (SQL) standards, such as PostgreSQL, also known as Postgres.

Query engine 102, having retrieved knowledge base articles, software and/or hardware manuals, etc. pertinent to addressing the user identity query, at act 410, can commence creating prompt query data. Prompt query data generated at act 410 can be based on previous and past interactions (e.g., chat histories) that the user identity can have had with system 100. Further the prompt query data generated at 410 can also be based on the knowledge base articles, software and/or hardware manuals, etc. that can have been retrieved at act 408. In regard to creating and generating the prompt query data, at act 410, the prompt query data, in some embodiments, can be generated with interpretative tags having been associated with the retrieved knowledge base articles, software and/or hardware manuals, and the like. In other embodiments, the prompt query data created and generated, at act 410, can be created and/or generated without interpretative tags having been associated with the retrieved knowledge base articles, software and/or hardware manuals, . . . .

Query engine 102, in response to having created and/or generated prompt query data, can forward it to a large language model (e.g., a first large language model) at act 412. The large language model can be used to generate coherent and contextually relevant text based on the initial user entity query and the generated prompt query data. The large language model, can use capabilities, such as sentiment analysis, question answering, and summarization, in order to provide a first answer (see e.g., FIG. 7) and/or a first answer with knowledge based articles (see e.g., FIG. 8). The first answer and/or the first answer associated with retrieved knowledge base articles, as respectively illustrated FIGS. 7 and 8, at act 414, can then be directed to second knowledge base equipment 704 and/or 804 for additional processing.

However, prior to being sent to second knowledge base equipment 704 and/or 804, a determination can be made, at act 416, as to whether the first answer and/or the first answer associated with retrieved knowledge base articles relate to an "INTERNAL" classification (e.g., a classification that indicates that the first answer and/or the first answer with retrieved knowledge base articles relate to, or comprise, corporate entity proprietary data and/or contain data that requires the assistance/authority of support agent identities to facilitate and/or effectuate implementation of actions included in the knowledge base articles).

Where, at act 416, it is determined that the retrieved knowledge base articles relate to, or comprise, corporate entity proprietary data, and/or contain data that requires the assistance of support agent identities (e.g., system administrative capabilities), at act 420, the first answer and/or the first answer associated with retrieved knowledge base articles can be directed to an embeddings aspects, wherein embeddings associated with using the second knowledge base equipment can be performed.

As has been noted earlier and without limitation and/or loss of generality, in many embodiments the disclosure can use vector embeddings that are high-dimensional numerical representations of data, such as words, images, documents, that capture their semantic meaning or features. Further, vector databases, such as first vector storage included in first knowledge base equipment 702 and 802 and second vector storage included in second knowledge base equipment 704 and 604, can perform similarity searches, finding vectors that are proximate to a specified query vector in a multidimensional embedding space, often measured using distance metrics, such as Euclidean distance, cosine similarity, and/or Manhattan distance.

As has also been detailed above, embeddings capture the semantic meaning or features of the objects in a way that facilitates various machine learning and natural language processing tasks. As a brief recap, embeddings are vectors in high-dimensional space, wherein each dimension can represent a specific attribute or feature of the object being embedded. Generally, objects that are semantically similar or share similar features can be represented by vectors that are close to one another in the embedding space. The distance between vectors can be measured using metrics like cosine similarity or Euclidean distance.

At act 420, as detailed in regard to act 404, embeddings can include tokenizing text; breaking down the text into smaller units called tokens. These tokens can be words, sentences, or individual characters, depending on the level of granularity needed for the analysis or processing task. Tokenization can also include removing stop words for instance, words in natural language that are typically filtered out or ignored by search engines and text processing algorithms because they are considered to have little value in terms of meaning or relevance to the overall context of a document. Additionally, tokenizing can also include creating data structures, such as inverted indices. Inverted indices, as noted earlier, can be an inverted version of a forward index, which unlike inverted indices that map terms to documents, store the content of each document along with metadata, allowing for efficient access to the full text of documents, which typically maps from documents to terms, which in turn allow for quick lookup of terms and documents.

Once tokenized, the tokenized data (e.g., the first answer emanating from first knowledge base equipment 702 and/or the first answer output by first knowledge base equipment 802) can be processed to extract relevant terms and phrases. Extracting relevant terms and phrases in certain embodiments can include stemming, lemmatization, and/or performing morphological analyses to extract meaningful components such as stems, root words, prefixes, suffixes, and inflections.

Thereafter, at acts 422 and 424, the tokenized data can be used, by query engine 102, to identify support agent-based data that can include support agent attributes, such as relevant education levels, expertise related to the knowledge base articles that can have been identified earlier at acts 404-414, current and/or future availability, current geographical location data (e.g., determined by autonomous geo-positioning data received, by support agent user equipment associated with a support agent, from global navigation satellite system equipment), and historical successes and/or failures related to providing timely user support in resolving the user identity query for which the knowledge base articles were initially obtained and/or retrieved. In regard to act 422, vector storage equipment can initially be used, by query engine 102, to determine, based on vector embeddings, the closest groups of support agents that satisfy the criteria encapsulated by the tokenized data (e.g., the first answer emanating from first knowledge base equipment 702 and/or the first answer output by first knowledge base equipment 802). At act 424, query engine 102 can determine and retrieve, in collaboration with, for instance, a RDBMS that persists, for example, based on support agent attribute data, data associated support agent identities included in the closest groups of support agents that satisfy the criteria encapsulated by the tokenized data.

At act 426, query engine 102 can commence creating prompt data (e.g., second prompt data generated by second knowledge base equipment 704 or second knowledge based equipment 804). The second prompt data emanating from second knowledge base equipment 704 and/or second knowledge based equipment 804 can be based on lists of knowledge base articles that can have been determined and identified at acts 404-414, as well as ranked (e.g., an assignment of a rank to each item in a list based at least in part on the item's value relative to other items included in the list, wherein the assigned ranking addresses ties between items where multiple items have the same rank, but can result in gaps in the ranking sequence) and/or ordered (e.g., arranged according to a specified criterion, wherein each item in the list is positioned based on its value relative to the other items in the list) lists associated with support agent attribute data and support agent identities included in the closest groups of support agents.

At act 428, query engine 102, can utilize a large language model (e.g., second large language model illustrated in FIGS. 7 and 8) to generate and supply coherent and contextually relevant text data based, for example, on the second prompt data created at act 426. The coherent and contextually relevant text data can be used by one or more of the support agent identities included in the closest groups of support agents to appraise themselves of the issue(s) included in the initial user identity query, determine the sufficiency of the knowledge base articles that can have been identified and selected by the first knowledge base equipment (e.g. first knowledge base equipment 702 and 802) to remedy the issue(s) set forth in the user identity query. Once query engine 102 completes usage of the second large language model, the resultant coherent and contextually text data can be used to create a service request ticket at act 430. The generated service request ticket, at act 432, can include all the documentation and/or data that can have been identified earlier, such as knowledge base articles, relevant manuals, release note updates, and the like.

Once query engine 102 has created and generated the service request ticket and has associated all the documentation and data at act 432, at act 434, a repository comprising past chat interactions that the user identity can have had with system 100 can be updated/revised. After updating the repository of past chat interaction at act 434, at act 436, a response to the initial user identity query can be forwarded to the first knowledge base equipment (e.g., first knowledge base equipment 702 and/or first knowledge base equipment 802).

At act 438, query engine 102 can perform feedback analysis and, where needed, update data associated each of the first embeddings and the second embeddings, first large language model, second large language model, weightings associated with the respective multidimensional vector spaces associated with the first RAG model and the first vector storage aspect, and the second RAG model and the second vector storage aspect. Once act 438 completes, at act 440, each of the first large language model, the second large language model, the respective multidimensional vector spaces, and/or the first and second RAG models can be re-executed/regenerated in order to refresh each of the models. At act 442, an answer to the query that the user identity had initially posed can be returned to the user identity via their user equipment. Also, at act 442, an associated service ticket identifying a service agent identity can also be included with the answer to the query.

FIG. 2 illustrates a method 200 for service request generation using generative artificial intelligence, in accordance with various example embodiments. Method 200 can begin at act 202, where query engine 102 can receive a user identity query from user equipment associated with a user identity. At act 204, in response to receiving the user identity query, query engine 102 can perform embeddings on the user identity query, wherein the user identity query, being a group of text data, can be tokenized, whereby the group of text data can be broken down into smaller units representing token. Tokenization can reduce the input text data into words, sentences, or individual characters, depending, for example, on the level of granularity needed for the analysis of the input group of text data. Additionally, at act 204, stop words—words in natural language that can generally be filtered out or ignored as these words do not, typically, convey much meaning or relevance to the overall context of the input group of text data. As observed earlier, stop words in the English language can include words, such as, "the," "is," "at," and the like. Additionally, and/or alternatively, at act 204, data structures can be created, such as inverted indices.

Also, at act 204, based on the tokenization of the input group of text data that can be representative of the user identity input query, query engine 102 can determine the one or more closest groups of knowledge base articles, software and/or hardware manuals, release notes, etc., that can address the input user identity query. The determination of the closest groups of knowledge base articles, software and/or hardware manuals, release notes, etc., can be based on vector embeddings that can have been performed earlier. The vector embeddings, when used in collaboration with one or more vector storage equipment/vector database equipment, can expedite searching through a multidimensional vector space for items such as knowledge base articles, software and/or hardware manuals, release notes, etc. that can satisfy the user identity query.

Once the closest groups of knowledge base articles, software and/or hardware manuals, release notes, etc. have been identified, at act 204, query engine 102 can retrieve the actual knowledge base articles, software and/or hardware manuals, release notes from a knowledge base article repository, such as a RDBMS. Thereafter, query engine 102 can commence creating prompt query data. As has been noted above, creation, and/or updating, of prompt query data can be based on previous and/or past interactions that a user identity can have had with system 100. Additionally, and/or alternatively, in various embodiments creation, and/or updating, of prompt query data can be based on the knowledge base articles, software and/or hardware manuals, etc., that can have been retrieved. In some embodiments, prompt query data can be generated with interpretive tags having been associated with the retrieved knowledge base articles, etc. In other embodiments, prompt query data can be created and generated without interpretative tags having been associated with the retrieved data (e.g., knowledge base articles, software and/or hardware manuals, etc.).

Once query engine 102 has created and/or generated the prompt query data, the prompt query data can be supplied to a first large language model. The first large language model, based at least on the prompt query data, can be employed to generate coherent and contextually relevant text in response to the initial user entity query. The first large language model can use techniques, such as sentiment analysis, question answering, and summarization to generate a first answer and/or a first answer together with the retrieved data (e.g., knowledge base articles, software and/or hardware manuals, . . . ). The generated, coherent and contextually relevant text can represent a first answer.

Contemporaneously with having generated the first answer, query engine 102, at act 206, can make a determination as to whether or not the first answer (and/or the associated retrieved data) relates to corporate entity proprietary data (e.g., the first answer and/or the retrieved data has been identified as not being available to identities outside the corporate entity business enterprise and/or the retrieved data has been deemed to only be accessible by selected internal user identities within the corporate entity business enterprise). Where the result of the determination, at act 206, is that the first answer and/or the retrieved data are restricted, query engine can proceed to act 208.

At act 208, query engine 102, having created and/or generated coherent and contextually and relevant first answer and further determined that the first answer and/or the retrieved data comprise restricted data, based on the first answer can perform second embeddings. The second embeddings can be vector embeddings that can be high-dimensional numerical representations of data, such as words, images, documents, and the like. The embeddings can capture, as numerical value representations, the semantic meanings and/or features of the words, images, documents, etc.

As has been noted earlier, embeddings can comprise tokenizing text; breaking down the text into smaller units called tokens. These tokens can be words, sentences, or individual characters, depending on the level of granularity needed for the analysis and processing tasks. Tokenization can also include removing start words for instance, words in the answer language that are typically filtered out or ignored by search engines and text processing algorithms because they are considered to have little value in terms of meaning or relevance to the overall context of a document. Additionally, tokenizing can also include creating data structures, such as inverted indices.

Once the embedding has taken place, the tokenized data can be used, by query engine 102, to identify support-agent-based data that can include support agent attribute such as relevant education levels, expertise related to the knowledge base articles that can have been identified earlier, current and/or future availability, current geographical location data and historical successes and or failures related to providing timely user support in resolving the user identity query for which the knowledge base articles were initially obtained and/or retrieved. In achieving the identification of support-agent-based data representative of a support agent identity, vector storage equipment can be used to determine, based on vector embedding, the closest groups of support agents that satisfy criteria included in the now tokenized first answer.

Once query engine 102 has determined the closest groups of support agents, and based at least in part on the identified closest groups of support agents, query engine 102 can retrieve, from a RDBMS, support agent attribute data associated with support agent identities included in the closest groups of support agents. Support agent attribute data can comprise information related to a support agent identity's geographic location, availability, experience in relation to providing user support in regard to the issue to which the user identity query pertains, and the like. Retrieval of the support agent attribute data associated with support agent identities can take the form of unordered lists, thus query engine 102, using one or more sorting/ranking/ordering criteria can order, rank, or sort the unordered lists into ordered/ranked/sorted lists at act 210. These lists can be second prompt data that can be fed into a second large language model, at act 212, to generate and supply coherent and contextually relevant text data, based, for instance, on the second prompt data generated at act 210. The coherent and contextually relevant text data together with all the documentation and/or data that can have been identified and retrieved earlier, such a knowledge base articles, relevant manuals, release note updates, and the like, can be used to generate a service request ticket.

FIG. 3 illustrates a method 300 for service request generation using generative artificial intelligence, in accordance with various example embodiments. Method 300 commences at act 302, where query engine 102, can receive a user identity query from user equipment associated with a user identity. At act 304, query engine 102, in response to receiving the user identity query, can apply first embeddings to the user identity query, wherein the first embeddings converts alphanumeric character strings to first vector values. Further, at act 304 query engine 102, by using the first vector values, can determine a group of data representative of knowledge base articles, wherein the group of data is associated with second vector values within a first vector space.

At act 306, based on the second vector values, query engine 102 can retrieve from first database equipment the knowledge base articles. At act 308, based on text content included in the knowledge base articles, second embeddings can be applied to the text content of the knowledge base articles. The second embeddings convert the text content of the knowledge base articles to third vector values that are recognizable in a second vector space that is distinct and differentiable from the first vector space. At act 310, query engine 102, using the third vector values, determines a listing of support agent identities, wherein the listing of support agent identities are associated with fourth vector values included in the second vector space, and wherein the third vector values approximate the fourth vector values.

At act 312, query engine 102, based in the fourth vector values, can retrieve from second database equipment, the listing of support agent identities. At act 314, query engine 102 can generate a service ticket by attaching knowledge base articles that can have been retrieved, and one or more support agent identity that is competent to resolve the issue included in the user identity query received at act 302, and transmit the service ticket the user equipment associated with the user identity.

Concerning act 306 above, once query engine 102 has retrieved, from first database equipment, the knowledge base articles etc., the knowledge base articles, etc., can be directed toward a first large language model. The first large language model can generate a humanly comprehensible first answer and/or a humanly comprehensible first answer (e.g., an overview or summary of the retrieved knowledge base articles with step by step instructions to facilitate resolutions to the issues raised in the user query) together with the retrieved knowledge base articles, etc. The first answer and/or the first answer together with the retrieved knowledge base articles, in some embodiments, can be transmitted to user equipment associated with the user identity. Also, subsequent to act 306, the first answer and/or the first answer together with the retrieved knowledge base articles, in additional and/or alternative embodiments, can be vectorized and embedded using the second embeddings process as outlined at act 308.

Figure 5:
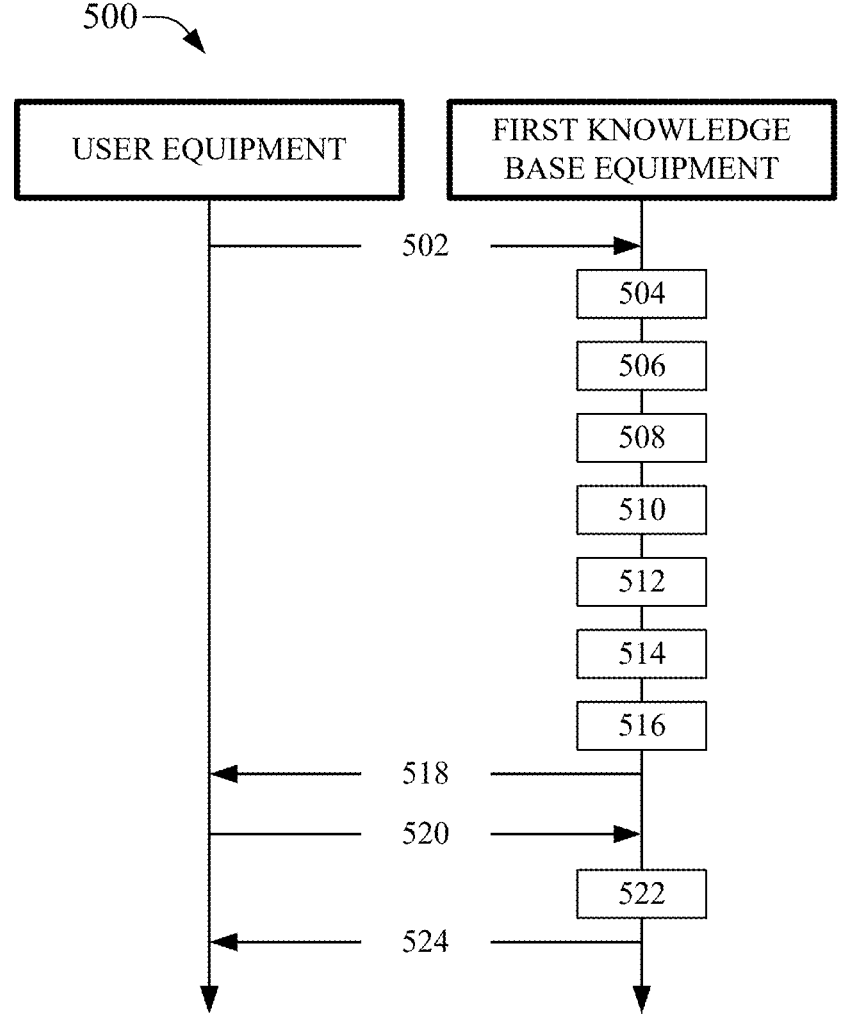
FIG. 5 illustrates an additional example time sequence chart depicting events and interactions for service request generation using generative artificial intelligence, in accordance with various non-limiting example embodiments.

FIG. 5 depicts a time sequence 500 to illustrate the interactions between user equipment and first knowledge base equipment, in accordance with various example embodiments. Time sequence 500 begins at act 502, where first knowledge base equipment (e.g., query engine 102) can receive a user identity query from user equipment associated with a user identity. At act 504, in response to receiving the user identity query, query engine 102 can perform first embeddings on the user identity query, wherein the user identity query, being a group of text data, can be tokenized, whereby the group of text data can be broken down into smaller units representing tokens, stop words filtered out or ignored as these words in general do not convey much meaning or relevance to the overall context of the input group of text data, and data structures can be created, such as inverted indices.

Also, at act 506, based on the tokenization of the input group of text data that can be representative of the user identity input query, query engine 102 can determine the one or more closest groups of knowledge base articles, software and/or hardware manuals, release notes, etc., that can address the input user identity query. The determination of the closest groups of knowledge base articles, software and/or hardware manuals, release notes, etc., can be based on the vector embeddings that can have been performed earlier. The vector embeddings, when used in collaboration with one or more vector storage equipment/vector database equipment, can expedite searching through a vast multidimensional vector space for items such as knowledge base articles, software and/or hardware manuals, release notes, etc. that can satisfy the user identity query.

Once the closest groups of knowledge base articles, software and/or hardware manuals, release notes, etc. have been identified, at act 508, query engine 102 can retrieve the actual the knowledge base articles, software and/or hardware manuals, release notes, etc. a knowledge base article repository, such as a RDBMS. Thereafter, query engine 102 can commence creating prompt query data, at act 510. As has been noted above, creation, and/or updating, of prompt query data, at act 510, can be based on previous and/or past interactions that a user identity can have had with system 100. Additionally, and/or alternatively, in various embodiments creation, and/or updating, of prompt query data, at act 510, can be based on the knowledge base articles, software and/or hardware manuals, etc., that can have been retrieved at act 508. In some embodiments, prompt query data can be generated with interpretive tags having been associated with the retrieved knowledge base articles, etc. In other embodiments, prompt query data can be created and generated without interpretative tags having been associated with the retrieved data (e.g., knowledge base articles, software and/or hardware manuals, etc.).

Once query engine 102 has created and/or generated the prompt query data, the prompt query data, at act 512, can be supplied to a first large language model. The first large language model, based at least on the prompt query data, can be employed to generate, at act 514, coherent and contextually relevant text in response to the initial user entity query. The first large language model can use techniques, such as sentiment analysis, question answering, and summarization to generate a first answer and/or a first answer together with the retrieved data (e.g., knowledge base articles, software and/or hardware manuals, . . . ). The generated, coherent and contextually relevant, text can represent a first answer.

At act 516, contemporaneously with having generated the first answer, query engine 102, at act 514, can make a determination as to whether or not the first answer (and/or the associated retrieved data) relates to corporate entity proprietary data (e.g., the first answer and/or the retrieved data has been identified as not being available to identities outside the corporate entity business enterprise and/or the retrieved data has been deemed to only be accessible by selected internal user identities within the corporate entity business enterprise). Where the result of the determination, at act 516, is that the first answer and/or the retrieved data is not restricted, query engine can proceed to act 518.

At act 518, the first answer and/or the retrieved data can be transmitted to the user equipment associated with the user identity that initiated the query, at which point the user identity can peruse, analyze, and determine whether the retrieved data addresses the query that was initially transmitted to system 100 at act 502. In instances where the user identity is unsatisfied with the received documentation or is in need of additional guidance, the user identity, via their user equipment, at act 520, can send back, to system 100, an indication that the retrieved data does not fully address the issue(s) stated in the query that was initially sent by the user identity at act 502.

At act 522, query engine 102, having created and/or generated coherent and contextually and relevant first answer at act 514, and further determined that the first answer and/or the retrieved data have not satisfied the user identity at act 520, based on the first answer can perform second embeddings. The second embeddings, like the first embeddings, can be vector embeddings that can be high-dimensional numerical representations of data, such as words, images, documents, and the like. The embeddings can capture, as numerical value representations, the semantic meanings and/or features of the words, images, documents, etc.

As has been noted earlier, embeddings can comprise tokenizing text; breaking down the text into smaller units called tokens. These tokens can be words, sentences, or individual characters, depending on the level of granularity needed for the analysis and processing tasks. Tokenization can also include removing start words for instance, words in the answer language that are typically filtered out or ignored by search engines and text processing algorithms because they are considered to have little value in terms of meaning or relevance to the overall context of a document. Additionally, tokenizing can also include creating data structures, such as inverted indices.

Once the embedding has taken place, query engine 102, can use the embedding to identify support-agent-based data that can include support agent attributes such as relevant education levels, expertise related to the knowledge base articles that can have been identified earlier, current and/or future availability, current geographical location data and historical successes and or failures related to providing timely user support in resolving the user identity query for which the knowledge base articles were initially obtained and/or retrieved. In achieving the identification of support-agent-based data representative of a support agent identity, vector storage equipment can be used to determine, based on vector embedding, the closest groups of support agents that satisfy criteria included in the now tokenized first answer.

Once query engine 102 has determined the closest groups of support agents, and based at least in part on the identified closest groups of support agents, query engine 102 can retrieve, from a RDBMS, support agent attribute data associated with support agent identities included in the closest groups of support agents. Support agent attribute data can comprise information related to a support agent identity's geographic location, availability, experience in relation to providing user support in regard to the issue to which the user identity query pertains, and the like. As observed above, retrieval of the support agent attribute data associated with support agent identities can take the form of unordered lists, thus query engine 102, using one or more sorting/ranking/ordering criterion can order, rank, or sort the unordered lists into ordered/ranked/sorted lists. These lists can be second prompt data that can be fed into a second large language model to generate and supply coherent and contextually relevant text data, based, for instance, on the second prompt data. The coherent and contextually relevant text data together with all the documentation and/or data that can have been identified and retrieved earlier, such a knowledge base articles, relevant manuals, release note updates, and the like, can be used to generate a service request ticket at act 524.

Figure 6:
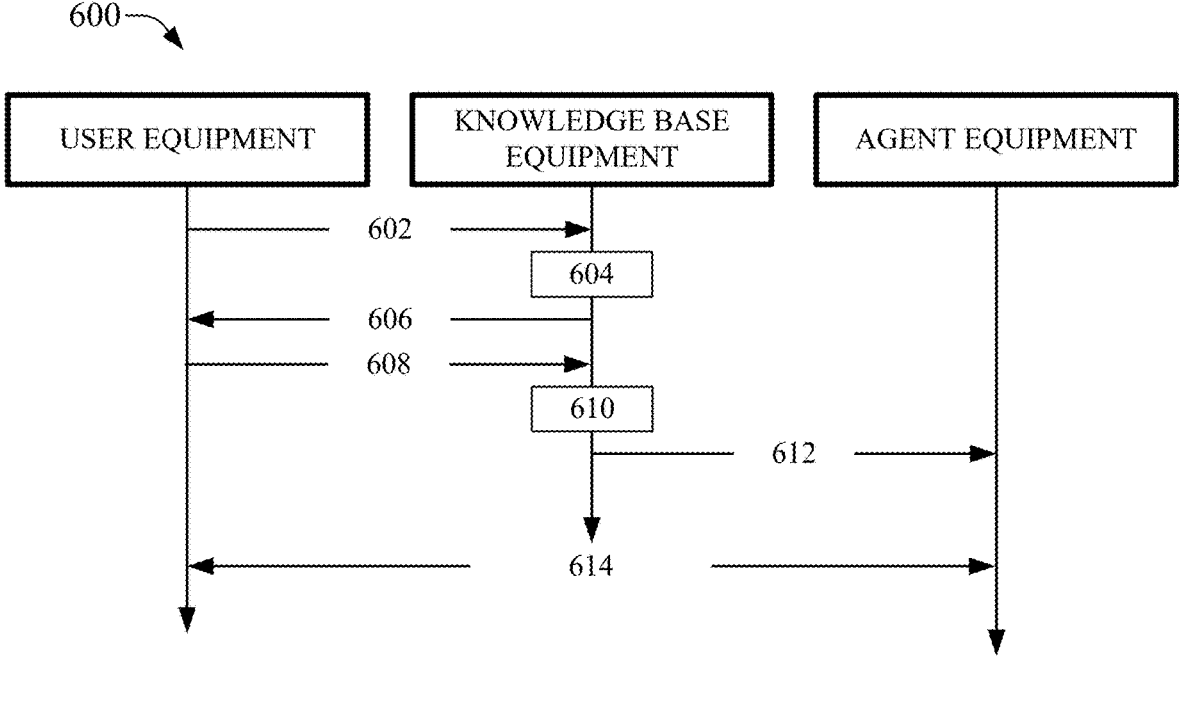
FIG. 6 illustrates a further example time sequence chart depicting events and interactions for service request generation using generative artificial intelligence, in accordance with various non-limiting example embodiments.

FIG. 6 depicts a time sequence 600 that illustrates the interactions between user equipment, knowledge base equipment, and knowledge base equipment, in accordance with various example embodiments. Time sequence 600 begins at act 602, where knowledge base equipment (e.g., query engine 102) can receive a user identity query from user equipment associated with a user identity. At act 604, in response to receiving the user identity query, query engine 102 can perform first embeddings on the user identity query, wherein the user identity query, being a group of text data, can be tokenized, whereby the group of text data can be broken down into smaller units representing tokens, stop words filtered out or ignored as these words in general do not convey much meaning or relevance to the overall context of the input group of text data, and data structures can be created, such as inverted indices.

Based on the tokenization of the input group of text data that can be representative of the user identity input query, query engine 102 can determine the one or more closest groups of knowledge base articles, software and/or hardware manuals, release notes, etc., that can address the input user identity query. The determination of the closest groups of knowledge base articles, software and/or hardware manuals, release notes, etc., can be based on the vector embeddings that can have been performed earlier. The vector embeddings, when used in collaboration with one or more vector storage equipment/vector database equipment, can expedite searching through a vast multidimensional vector space for items such as knowledge base articles, software and/or hardware manuals, release notes, etc. that can satisfy the user identity query.

Once the closest groups of knowledge base articles, software and/or hardware manuals, release notes, etc. have been identified query engine 102 can retrieve the actual the knowledge base articles, software and/or hardware manuals, release notes, etc. a knowledge base article repository, such as a RDBMS. Thereafter, query engine 102 can commence creating prompt query data. As has been noted above, creation, and/or updating, of prompt query data, can be based on previous and/or past interactions that a user identity can have had with system 100. Additionally, and/or alternatively, in various embodiments creation, and/or updating, of prompt query data can be based on the knowledge base articles, software and/or hardware manuals, etc., that can have been retrieved. In some embodiments, prompt query data can be generated with interpretive tags having been associated with the retrieved knowledge base articles, etc. In other embodiments, prompt query data can be created and generated without interpretative tags having been associated with the retrieved data (e.g., knowledge base articles, software and/or hardware manuals, etc.).

Once query engine 102 has created and/or generated the prompt query data, the prompt query data can be supplied to a first large language model. The first large language model, based at least on the prompt query data, can be employed to generate coherent and contextually relevant text in response to the initial user entity query. The first large language model can use techniques, such as sentiment analysis, question answering, and summarization to generate a first answer and/or a first answer together with the retrieved data (e.g., knowledge base articles, software and/or hardware manuals, . . . ). The generated, coherent and contextually relevant text can represent a first answer.

Contemporaneously with having generated the first answer, query engine 102 can make a determination as to whether or not the first answer (and/or the associated retrieved data) relates to corporate entity proprietary data (e.g., the first answer and/or the retrieved data has been identified as not being available to identities outside the corporate entity business enterprise and/or the retrieved data has been deemed to only be accessible by selected internal user identities within the corporate entity business enterprise). Where the result of the determination is that the first answer and/or the retrieved data is not restricted, query engine can proceed to act 606.

At act 606, the first answer and/or the retrieved data can be transmitted to the user equipment associated with the user identity that initiated the query, at which point the user identity can peruse, analyze, and determine whether the retrieved data addresses the query that was initially transmitted to system 100 at act 602. In instances where the user identity is unsatisfied with the received documentation or is in need of additional guidance, the user identity, via their user equipment, at act 608, can send back, to system 100, an indication that the retrieved data does not fully address the issue(s) stated in the query that was initially sent by the user identity at act 602.

At act 610, query engine 102, having created and/or generated coherent and contextually and relevant first answer, and further determined that the first answer and/or the retrieved data have not satisfied the user identity at act 610, based on the first answer can perform second embeddings. As noted above, the second embeddings, like the first embeddings, can be vector embeddings that can be high-dimensional numerical representations of data, such as words, images, documents, and the like. The embeddings can capture, as numerical value representations, the semantic meanings and/or features of the words, images, documents, etc.

As has been noted earlier, embeddings can comprise tokenizing text; breaking down the text into smaller units called tokens. These tokens can be words, sentences, or individual characters, depending on the level of granularity needed for the analysis and processing tasks. Tokenization can also include removing start words for instance, words in the answer language that are typically filtered out or ignored by search engines and text processing algorithms because they are considered to have little value in terms of meaning or relevance to the overall context of a document. Additionally, tokenizing can also include creating data structures, such as inverted indices.

Once the embedding has taken place, query engine 102, can use the embedding to identify support-agent-based data that can include support agent attributes such as relevant education levels, expertise related to the knowledge base articles that can have been identified earlier, current and/or future availability, current geographical location data and historical successes and or failures related to providing timely user support in resolving the user identity query for which the knowledge base articles were initially obtained and/or retrieved. In achieving the identification of support-agent-based data representative of a support agent identity, vector storage equipment can be used to determine, based on vector embedding, the closest groups of support agents that satisfy criteria included in the now tokenized first answer.

Once query engine 102 has determined the closest groups of support agents, and based at least in part on the identified closest groups of support agents, query engine 102 can retrieve, from a RDBMS, support agent attribute data associated with support agent identities included in the closest groups of support agents. Support agent attribute data can comprise information related to a support agent identity's geographic location, availability, experience in relation to providing user support in regard to the issue to which the user identity query pertains, and the like. As observed above, retrieval of the support agent attribute data associated with support agent identities can take the form of unordered lists, thus query engine 102, using one or more sorting/ranking/ordering criterion can order, rank, or sort the unordered lists into ordered/ranked/sorted lists. These lists can be second prompt data that can be fed into a second large language model to generate and supply coherent and contextually relevant text data, based, for instance, on the second prompt data. The coherent and contextually relevant text data together with all the documentation and/or data that can have been identified and retrieved earlier, such a knowledge base articles, relevant manuals, release note updates, and the like, can be used to generate a service request ticket and to transmit the generated service request ticket to support agent identity equipment at act 612.

At act 614, using the service request ticket received from the knowledge base equipment, the support agent identity using the support agent identity equipment can initiate contact with the user identity in order to resolve the issues that were raised in the query that was received at act 602.

It will be appreciated by those skilled in the art that the preceding examples and embodiments are exemplary and not limiting to the scope of the present disclosure. It shall also be noted that elements of any claims may be arranged differently including having multiple dependencies, configurations, and combinations.

Figure 9:
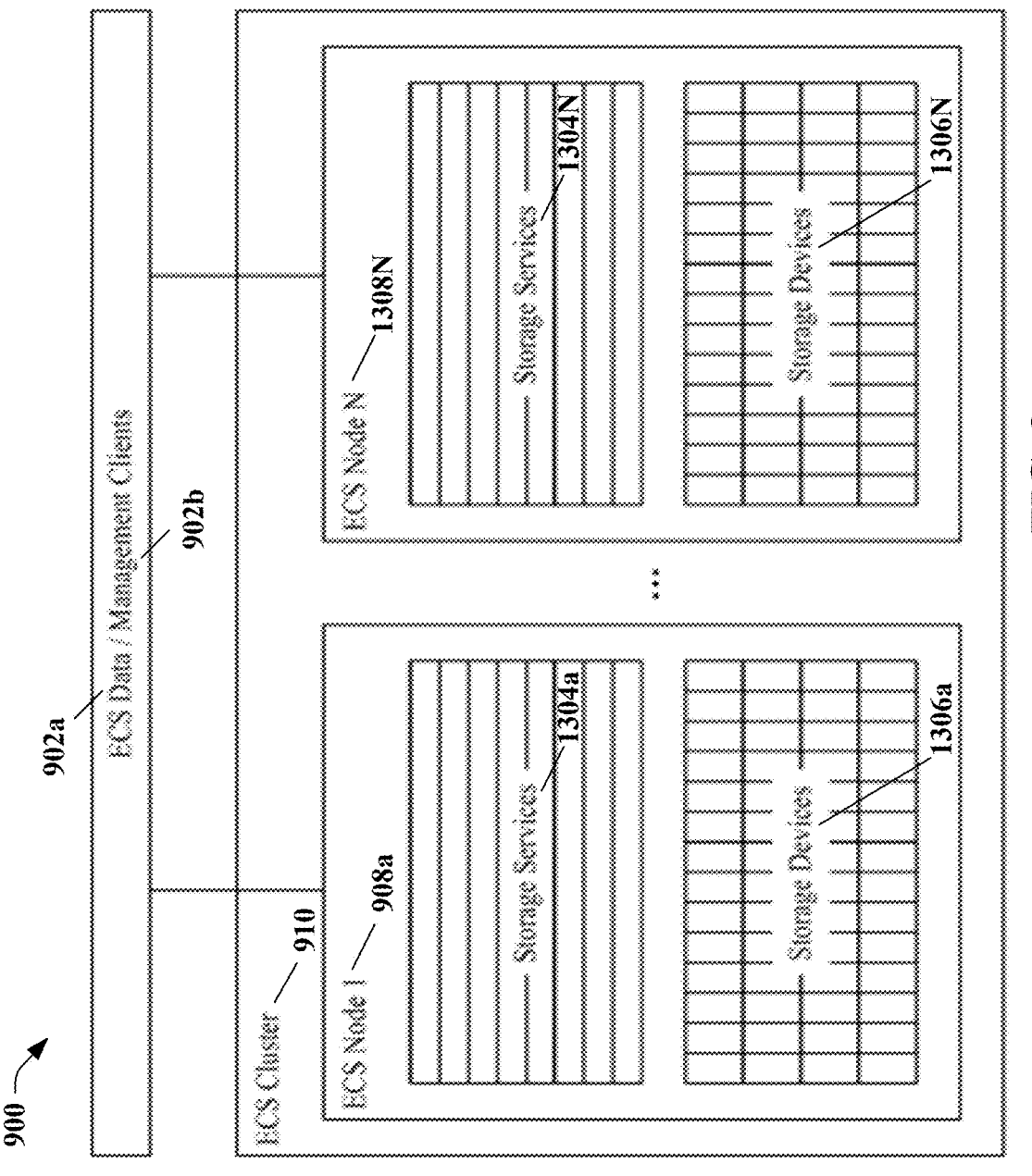
FIG. 9 illustrates an elastic cloud storage (ECS) system, in accordance with various non-limiting example embodiments.

In the following, FIG. 9 describes an example non-limiting cloud storage system in the non-limiting context of an ECS storage system, but for the avoidance of doubt, the subject embodiments can apply to any storage platform. For instance, in this regard, FIG. 9 illustrates an ECS storage system 900 comprising a cloud-based object storage appliance in which corresponding storage control software comprising, e.g., ECS data client(s) 902a, ECS management client(s) 902b, storage service(s) 904a . . . 904N, etc. and storage devices 906a . . . 906N (e.g., storage media, such as physical magnetic disk media, etc. of respective ECS nodes of ECS cluster 910) are combined as an integrated system with no access to the storage media other than through the ECS storage system 900.

In this regard, ECS cluster 910 comprises multiple nodes 908a . . . 908N, storage nodes, ECS nodes, etc. Each node is associated with storage devices 906a . . . 906N, e.g., hard drives, physical disk drives, storage media, etc. In embodiment(s), ECS node 908a, or any ECS node, executing on a hardware appliance can be communicatively coupled, connected, cabled to, etc., e.g., 15 to 120 storage devices. Further, each ECS node can execute one or more services for performing data storage operations described herein.

For instance, the ECS storage system 900 can be an append-only virtual storage platform that protects content from being erased or overwritten for a specified retention period. In particular, the ECS storage system 900 does not employ traditional data protection schemes like mirroring or parity protection. Instead, the ECS storage system 900 utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS storage system 900 can support storage, manipulation, and/or analysis of unstructured data on a massive scale on commodity hardware. As an example, the ECS storage system 900 can support mobile, cloud, big data, and/or social networking applications. In another example, the ECS storage system 900 can be deployed as a turnkey storage appliance, or as a software product that can be installed on a set of qualified commodity servers and disks, e.g., within a node, data storage node, etc. of a cluster, data storage cluster, etc. In this regard, the ECS storage system 900 can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word-without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1022, disk storage 1024, and/or memory storage 1046, further description of which is below. For instance, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
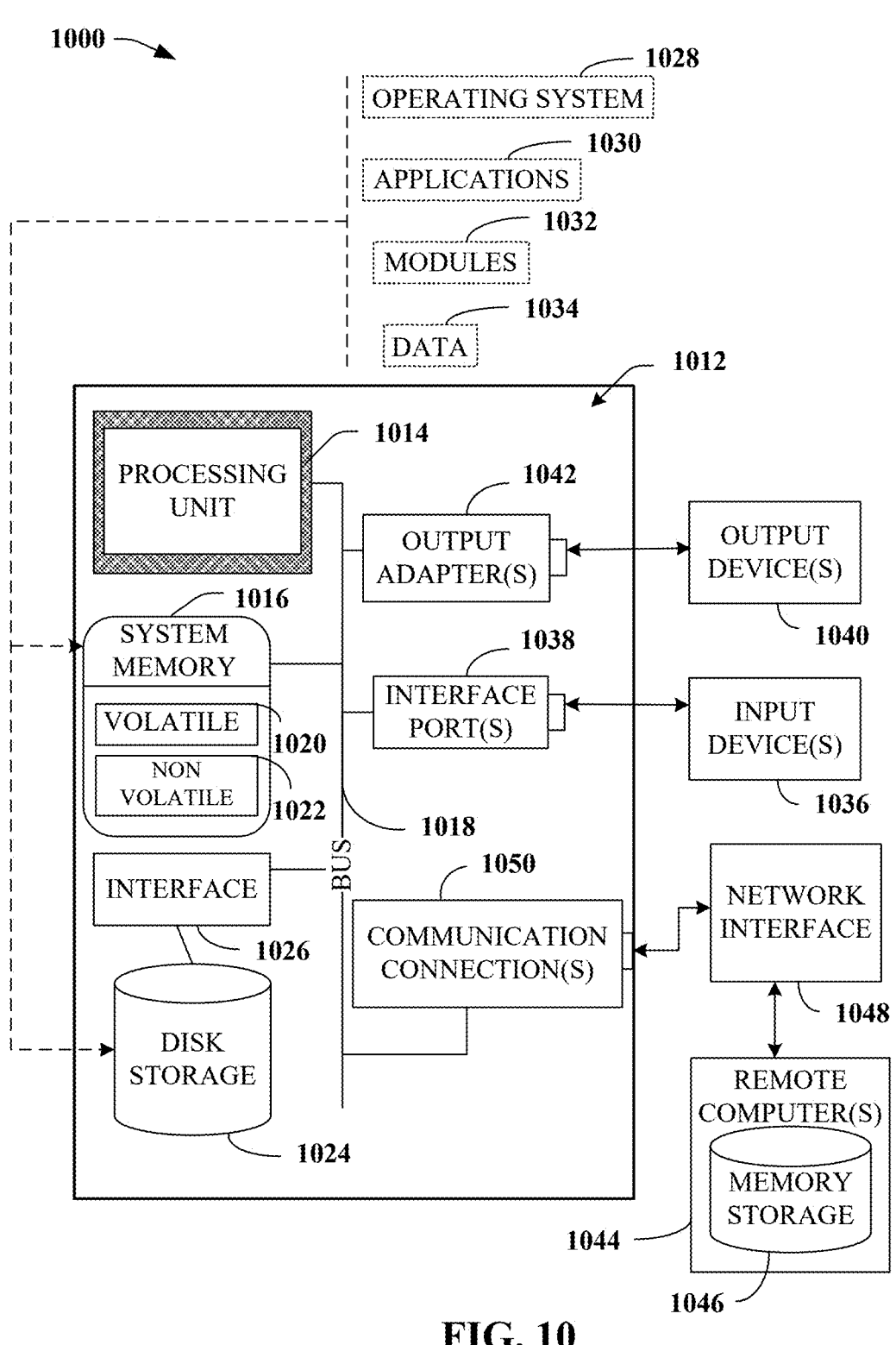
FIG. 10 illustrates a block diagram representing an illustrative non-limiting computing system or operating environment in which one or more aspects of various non-limiting embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

FIG. 10, a block diagram of a computing system 1000, e.g., system 100, operable to execute the disclosed systems and methods, is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at a 10 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. A system, comprising:
at least one processor; and
at least one memory that stores executable instructions that, when executed by the at least one processor, facilitate performance of operations, comprising:
receiving, from a user equipment, query data comprising one or more alphanumeric character strings;
applying a first embeddings process to the query data, wherein the first embeddings process converts the one or more alphanumeric character strings to first vector values that are recognizable in a first continuous vector space hosted by first vector storage equipment;
based on the first vector value, determining, within the first continuous vector space, a group of data representing knowledge base articles that are associated with second vector values that approximate the first vector values;
based on the second vector values, retrieving, from first database equipment, the knowledge base articles;
based on text content of the knowledge base articles, applying a second embeddings process to the text content of the knowledge base articles, wherein the second embeddings process converts the text content of the knowledge base articles to third vector values recognizable in a second continuous vector space hosted by second vector storage equipment;
based on the third vector values, determining a listing of support agent identities, wherein the listing of support agent identities is associated with fourth vector values, and wherein the fourth vector values approximate the third vector values;
based on the fourth vector values, retrieving from second database equipment, the listing of support agent identities capable of addressing a query included in the query data;

generating a service ticket comprising attaching the knowledge base articles and a support agent identity of the support agent identities approved to resolve the query, wherein the generating of the service ticket maximizes integration and use of various available repositories of corporate data persisted to corporate database equipment in order to determine the knowledge base articles and the support agent identities approved to resolve the query; and
transmitting the service ticket to the user equipment.

2. The system of claim 1, wherein the first embeddings process comprises: prior to applying the second embeddings process to the text content of the knowledge base articles, inputting the text content of the knowledge base articles to a first large language model that generates a first answer representing human identity recognizable text.

3. The system of claim 2, wherein the first answer is transmitted to the user equipment, wherein first user input associated with a user identity comprises appraisal information indicative of an appraisal of the first answer, and wherein, based on the appraisal of the first answer being determined to be unsatisfactory, second user input associated with the user identity, received via the user equipment, notifies the system that the first answer is unsatisfactory.

4. The system of claim 1, wherein the operations comprise, prior to generating the service ticket, inputting the knowledge base articles and a support agent identity to a second large language model that generates a second answer representing human recognizable text.

5. The system of claim 1, wherein the first embeddings process comprises: tokenizing the one or more alphanumeric character strings into one or more tokens, and wherein the tokenizing removes natural language words that are determined to be irrelevant to a semantic meaning of the one or more alphanumeric character strings.

6. The system of claim 1, wherein the first embedding process comprises stemming the one or more alphanumeric character strings to reduce words representative of the one or more character strings to a root form of the words.

7. The system of claim 1, wherein the first database equipment is a knowledge base article repository that is extensible and provides support for a structured query language.

8. A method, comprising:
in response to receiving, from a user equipment, query data comprising one or more alphanumeric character strings, performing, by knowledge base article equipment comprising at least one processor, a first embeddings process to the query data, wherein the first embeddings process converts the one or more alphanumeric character strings to first vector values that are recognizable in a first continuous vector space hosted by first vector storage equipment;
determining, by the knowledge base article equipment, within the first continuous vector space, a group of data representing knowledge base articles that are associated with second vector values that approximate the first vector values;
retrieving, by the knowledge base article equipment from first database equipment, the knowledge base articles;
based on text content of the knowledge base articles, performing, by the knowledge base article equipment, a second embeddings process to the text content of the knowledge base articles, wherein the second embeddings process converts the text content of the knowledge base articles to third vector values recognizable in a second continuous vector space hosted by second vector storage equipment;

determining, by the knowledge base article equipment, a listing of support agent identities, wherein the listing of support agent identities is associated with fourth vector values, and wherein the fourth vector values approximate the third vector values;

retrieving, by the knowledge base article equipment, from second database equipment, the listing of support agent identities capable of addressing a query included in the query data;

generating, by the knowledge base article equipment, a service ticket comprising attaching the knowledge base articles and a support agent identity of the support agent identities permitted to resolve the query, wherein the generating of the service ticket maximizes integration and use of collections of corporate data maintained on corporate database equipment in order to determine the knowledge base articles and the support agent identities permitted to resolve the query; and transmitting, by the knowledge base article equipment, the service ticket to the user equipment.

9. The method of claim 8, wherein the first embeddings process comprises: prior to applying the second embeddings process to the text content of the knowledge base articles, inputting, by the knowledge based article equipment, the text content of the knowledge base articles to a first large language model that generates a first answer representing human identity recognizable text.

10. The method of claim 9, wherein the first answer is transmitted to the user equipment, and wherein first user input associated with a user identity specifies an appraisal of the first answer and based on the appraisal of the first answer being unsatisfactory, second user input associated with the user identity, via the user equipment, notifies the system that the first answer is unsatisfactory.

11. The method of claim 8, further comprising prior to generating the service ticket, inputting, by the knowledge base article equipment, the knowledge base articles and a support agent identity to a second large language model that generates a second answer representing human identity recognizable text.

12. The method of claim 8, wherein the first embeddings process comprises tokenizing, by the knowledge base article equipment, the one or more alphanumeric character strings into one or more tokens, and wherein the tokenizing removes words in natural language that are irrelevant to a semantic meaning of the one or more alphanumeric character strings.

13. The method of claim 8, wherein the first embedding process comprises stemming, by the knowledge base equipment, the one or more alphanumeric character strings to reduce words representative of the one or more character strings to a root form of the words.

14. The method of claim 8, wherein the first database equipment is an extensible knowledge base article repository that provides support for a structured query language.

15. A non-transitory machine-readable medium, comprising executable instructions that, when executed by at least one processor, facilitate performance of operations, comprising:

receiving, from a user device, query data comprising one or more alphanumeric character strings;

applying a first embeddings process to the query data, wherein the first embeddings process converts the one or more alphanumeric character strings to first vector values that are recognizable in a first continuous vector space hosted by first vector storage equipment;

based on the first vector value, determining, within the first continuous vector space, a group of data representing knowledge base articles that are associated with second vector values that approximate the first vector values;

based on the second vector values, retrieving, from first database equipment, the knowledge base articles;

based on text content of the knowledge base articles, applying a second embeddings process to the text content of the knowledge base articles, wherein the second embeddings process converts the text content of the knowledge base articles to third vector values recognizable in a second continuous vector space hosted by second vector storage equipment;

based on the third vector values, determining a listing of support agent identities, wherein the listing of support agent identities is associated with fourth vector values, and wherein the fourth vector values approximate the third vector values;

based on the fourth vector values, retrieving, from second database equipment, the listing of support agent identities determined to be capable of addressing a query included in the query data;

generating a service ticket by attaching the knowledge base articles and a support agent identity of the support agent identities qualified to resolve the query, wherein the generating of the service ticket maximizes integration and use of corporate data stored to corporate database equipment in order to determine the knowledge base articles and the support agent identities qualified to resolve the query; and transmitting the service ticket to the user device.

16. The non-transitory machine-readable medium of claim 15, wherein the first embeddings process comprises: prior to applying the second embeddings process to the text content of the knowledge base articles, feeding the text content of the knowledge base articles to a first large language model that generates a first answer representing human identity recognizable text.

17. The non-transitory machine-readable medium of claim 16, wherein the first answer is transmitted to the user device, and wherein a user identity provides an appraisal of the first answer and based on the appraisal of the first answer being unsatisfactory, a notification associated with the user identity is received by the system, via the user device, indicative that the first answer is unsatisfactory.

18. The non-transitory machine-readable medium of claim 15, wherein the operations further comprising prior to generating the service ticket, feeding the knowledge base articles and a support agent identity to a second large language model that generates a second answer representing human recognizable text.

19. The non-transitory machine-readable medium of claim 15, wherein the first embeddings process comprises tokenizing the one or more alphanumeric character strings into one or more tokens, and wherein the tokenizing removes words in natural language that are irrelevant to a semantic meaning of the one or more alphanumeric character strings.

20. The non-transitory machine-readable medium of claim 15, wherein the first embedding process comprises stemming the one or more alphanumeric character strings to reduce words representative of the one or more character strings to a root form of the words.

* * * * *